E. G. BUDD.
METHOD OF ADJUSTING WIRE SPOKES OF WIRE SPOKED WHEELS.
APPLICATION FILED MAR. 29, 1917.
1,298,657.
Patented Apr. 1, 1919.
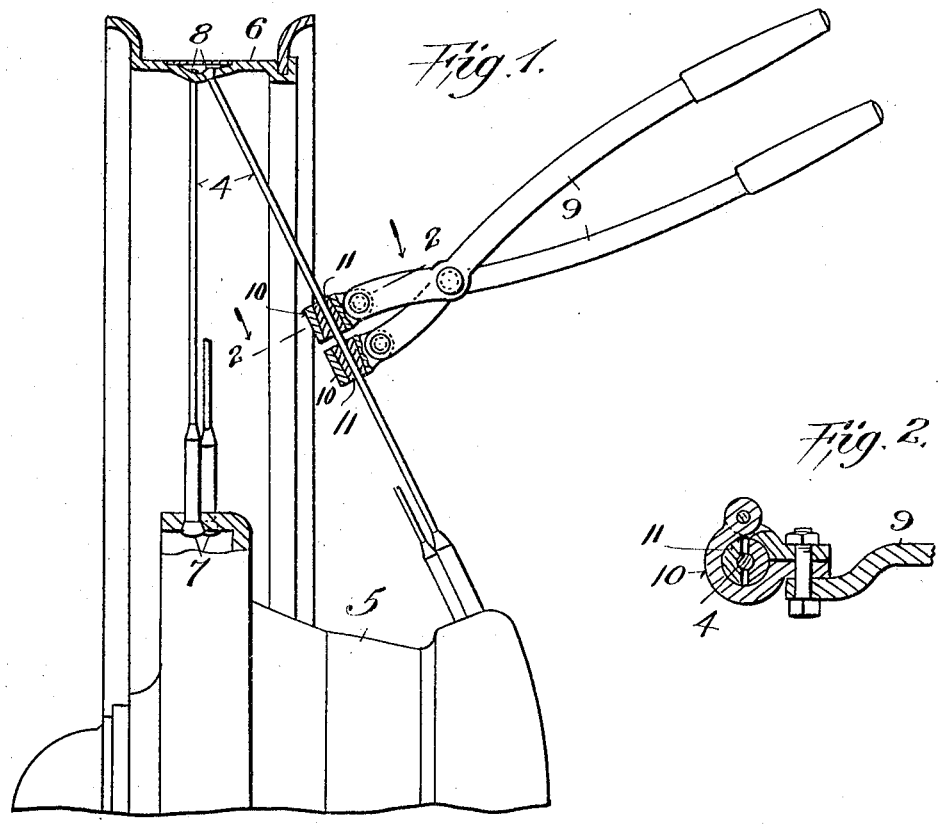
Inventor
Edward G. Budd
By his atty Samuel E. Darby

UNITED STATES PATENT OFFICE.

EDWARD G. BUDD, OF PHILADELPHIA, PENNSYLVANIA, ASSIGNOR TO BUDD WHEEL CORPORATION, OF PHILADELPHIA, PENNSYLVANIA, A CORPORATION OF VIRGINIA.

METHOD OF ADJUSTING WIRE SPOKES OF WIRE-SPOKED WHEELS.

1,298,657.     Specification of Letters Patent.     Patented Apr. 1, 1919.

Original application filed July 19, 1916, Serial No. 110,113. Divided and this application filed March 29, 1917. Serial No. 158,411.

*To all whom it may concern:*

Be it known that I, EDWARD G. BUDD, a citizen of the United States, residing at Philadelphia, in the county of Philadelphia, State of Pennsylvania, have made a certain new and useful Invention in Methods of Adjusting Wire Spokes of Wire-Spoked Wheels.

This invention relates to methods of adjusting the length of wire spokes for wire spoked wheels.

The object of the invention is to provide a method of adjustment of the lengths of wire spokes employed in wire spoked wheels, which is simple and effective and whereby the cost of constructing the wheel is very materially reduced.

Further objects of the invention will appear more fully hereinafter.

The invention consists substantially in the mode of operation as hereinafter more particularly pointed out, as illustrated in the accompanying drawing, and finally pointed out in the claims.

In the manufacture of wire spoked wheels it is a common expedient to connect the hub and rim of the wheel with wire spokes which are threaded at their ends to be engaged by screw caps, nuts or the like, in order to adjust the length of the spokes in truing up the wheel. It is important and necessary to properly true up the wheel after the spokes have been assembled in connecting relation with reference to the hub and rim in order that the wheel may be properly trued and the spoke tension equalized. Where the ends of the spokes are threaded and adjusting screw caps or nuts are employed for accomplishing this work, the cost of production of the wheel is increased by reason of the necessity for threading the ends of the spokes and tapping the adjusting caps or nuts. This work adds materially to the cost of manufacture of the wheel. It is among the special purposes of my present invention to provide a method of adjusting the length of the spokes in properly truing up the wheel and securing equality of spoke tension between the hub and rim, which avoids the necessity for cutting screw threads upon the spoke ends or of providing adjusting caps or nuts.

In the accompanying drawing I have shown various methods for carrying out my invention.

Figure 1 is a view, partly in elevation and partly in section, showing one method of accomplishing my objects and purposes.

Fig. 2 is a broken detail sectional view on the line 2, 2, Fig. 1, looking in the direction of the arrows.

In accordance with my invention I employ wire spokes 4 to connect the hub 5, and rim 6 of a wire spoked wheel. Any desired number or lacing arrangement of spokes may be employed, as my present invention does not reside in such features. In accordance with my invention I cut the wires which constitute the spokes to approximately the required length to be anchored at one end in the rim and at the other end in the hub. After inserting the spokes the ends 7, 8, are respectively upset endwise to form an anchor head shoulder or other connection respectively with the hub and rim.

In case any individual spoke should be of too great a length and thereby produce inequality of spoke tension, or if after the spokes have been inserted and their ends upset, as above explained, it should be necessary to adjust, either by shortening or by increasing the length of any individual spoke in order to secure equality of spoke tension or to properly true up the wheel I propose to physically extend or reduce the length of the spokes, or such of them as may require it. This extension in or reduction of the length of individual spokes may be accomplished in various ways. In Fig. 1 I have shown my invention as applied to the shortening of the length of the spokes. In the form shown this is accomplished by employing a tongs consisting of pivotally connected handles 9 carrying clamp heads 10 in which are seated, in this particular form, cone shaped gripping members 11, designed to embrace and grip the spokes 4, at a slight distance apart. Then by manipulating the tongs arms 9, the gripping members are forced toward each other, thereby physically shortening the spoke by upsetting the metal body thereof endwise in the space between the points engaged by the gripping members. By successively operating at different points along the length of the spoke the desired reduction in the length thereof, or shortening of the spoke is accomplished, until the tension of said spoke is equalized with that of the other spokes, and by successively operating on various spokes the desired truing of the wheel is accomplished. Where in the operation of truing the wheel it becomes necessary to increase the length of the spoke this may be accomplished in like manner by a reversal of the above described gripping members, as is obvious, and of the described operation in which case the gripping members 11 will be forced apart from each other instead of toward each other, thereby physically drawing out the length of the spoke.

Ordinarily the degree of variation in the length of the spokes, when care is exercised to initially cut the spokes to the required length, is quite small and consequently the method of adjustment above described is effective, and is carried out expeditiously and efficiently, thereby avoiding the cost incident to turning threads upon the spoke ends and applying adjusting nuts or sleeves thereto.

While I have shown and described my invention as carried out by physically shortening the individual spokes I do not claim herein the broad method of effecting variations in the lengths of individual spokes, nor the specific methods of varying such lengths by physically lengthening the individual spokes, as such subject matter is shown, described, and claimed in my pending application Serial No. 110,113, filed July 19, 1916, of which the present application is a division.

But having now set forth the object and nature of my invention, what I claim as new and useful and of my own invention and desire to secure by Letters Patent is, 1. The method of truing up wire spoked wheels which consists in physically reducing the lengths of individual spokes to vary the tension thereof relatively to other spokes of the wheel.

2. The method of truing up wire spoked wheels which consists in securing the ends of the spokes to the hub and rim, respectively, of the wheel, in approximately the required lengths of the spokes, and then physically shortening individual spokes, relatively to the other spokes, to vary the relative tension thereof.

3. The method of truing up wire spoked wheels which consists in securing the ends of the spokes to the hub and rim, respectively, of the wheel, in approximately the required lengths of the spokes, and then physically shortening individual spokes at successive portions of the lengths thereof, to vary the tension thereof relatively to the other spokes of the wheel.

4. The method of truing up wire spoked wheels which consists in securing the ends of the spokes to the hub and rim, respectively, of the wheel, in approximately the required lengths of the spokes, and then compressing the metal of individual spokes lengthwise thereof at successive portions of their lengths to vary the tension thereof relatively to other spokes of the wheel.

In testimony whereof I have hereunto set my hand on this third day of March A. D., 1917.

EDWARD G. BUDD.

Copies of this patent may be obtained for five cents each, by addressing the "Commissioner of Patents, Washington, D. C."